(12) United States Patent  
Jimenez, III et al.

(10) Patent No.: US 8,873,240 B2  
(45) Date of Patent: Oct. 28, 2014

(54) ROTATING MEZZANINE CARD BRACKET

(75) Inventors: Salvador D. Jimenez, III, Cedar Park, TX (US); Ku Hao Cheng, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 436 days.

(21) Appl. No.: 13/307,985

(22) Filed: Nov. 30, 2011

(65) Prior Publication Data

US 2013/0135813 A1    May 30, 2013

(51) Int. Cl.
*H05K 5/00*    (2006.01)

(52) U.S. Cl.
USPC .......................................................... 361/730

(58) Field of Classification Search
USPC .......................................................... 361/730
See application file for complete search history.

(56) References Cited

U.S. PATENT DOCUMENTS

| | | | |
|---|---|---|---|
| 4,598,974 A | 7/1986 | Munn et al. | |
| 5,999,416 A | 12/1999 | McNally et al. | |
| 6,206,582 B1 | 3/2001 | Gilliland | |
| 6,219,235 B1 * | 4/2001 | Diaz et al. | 361/695 |
| 6,219,255 B1 | 4/2001 | Teshome | |
| 6,439,781 B1 | 8/2002 | Gaio et al. | |
| 6,929,406 B2 | 8/2005 | Amorim | |
| 6,977,819 B2 * | 12/2005 | Bertram et al. | 361/730 |
| 6,994,478 B1 | 2/2006 | Chiu et al. | |
| 7,284,915 B2 | 10/2007 | Healy et al. | |
| 2003/0227761 A1 * | 12/2003 | Liao et al. | 361/801 |
| 2005/0111168 A1 * | 5/2005 | Carr et al. | 361/679 |
| 2009/0017664 A1 * | 1/2009 | McAlonis et al. | 439/326 |
| 2013/0052847 A1 * | 2/2013 | Figuerado et al. | 439/157 |

* cited by examiner

*Primary Examiner* — Forrest M Phillips

(74) *Attorney, Agent, or Firm* — Terrile, Cannatti, Chambers & Holland, LLP; Robert W. Holland

(57) ABSTRACT

An information handling system motherboard overlaps a component with a mezzanine card to provide additional room for components to couple to the motherboard. A mezzanine card bracket holds the mezzanine card in a parallel configuration over the motherboard. The mezzanine card bracket includes a rotating portion that supports the mezzanine card in a closed position and rotates to an open position to allow access to components disposed on the motherboard beneath the rotating portion, such as a memory module that is partially covered by the mezzanine card when the mezzanine card is installed on the mezzanine card bracket support surface.

20 Claims, 4 Drawing Sheets

ROTATING MEZZANINE CARD BRACKET

BACKGROUND OF THE INVENTION

1. Field of the Invention

The present invention relates in general to the field of information handling system component cards, and more particularly to an information handling system rotating mezzanine card bracket.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are typically built from a variety of components that are assembled into a chassis, such as one more central processing units (CPUs), dynamic random access memory (DRAM) dual in-line memory modules (DIMMs), hard disk drives (HDDs) and other processing components. End users can tailor an information handling system's capabilities by choosing the number and types of components that are included in the information handling system. One example of this is the number of DRAM DIMMs that are included in a chassis. A server information handling system motherboard can have 48 or more DIMM sockets, each of which accepts a DIMM that stores information for ready access by a CPU. By populating the DIMM sockets with DIMMs, the end user increases the capability of the server information handling system by increasing storage for the CPU to manage instructions and data. Additional DRAM tends to be particularly helpful with the running of complex applications and with busy information handling systems that have high CPU utilization levels. Information handling system manufacturers will sometimes include empty DIMM sockets on a motherboard so that an end user can populate the sockets with DIMMs if improved performance is desired. If all of the DIMM sockets are populated on a motherboard, then the end user is generally limited from increasing the DRAM that the CPU can access.

Data center rack space for supporting operation of a server information handling system often carries a high overhead expense. Information handling system manufacturers attempt to design the layout of a motherboard so that the information handling system includes a defined capability within a limited space. In order to maximize the processing capability within a chassis while minimizing its vertical height, manufacturers often include mezzanine cards that are disposed over and parallel to the motherboard. The mezzanine cards couple to the motherboard so that processing components on the mezzanine cards can interact with other components coupled to the motherboard. When a small-sized chassis is used to support the motherboard, the mezzanine cards can sometimes overlap other components, such as the DIMM latches, so that all of the components will fit within the chassis. Having overlapping components tends to make assembly and repair of the motherboard more complex. For example, if a mezzanine card bracket couples to the motherboard with a screw or other connector and extends over DIMM sockets, then populating or replacing DIMMS in DIMM sockets might call for removal of the mezzanine card and bracket before the DIMM sockets are accessible. The access to DIMM sockets is further complicated by the minimal room typically available to access components and by grounding interfaces that provide a ground from the motherboard through the bracket to the mezzanine card.

SUMMARY OF THE INVENTION

Therefore a need has arisen for a system and method which supports an arrangement of mezzanine cards over a motherboard with overlap of the mezzanine cards over other components.

In accordance with the present invention, a system and method are provided which substantially reduce the disadvantages and problems associated with previous methods and systems for coupling a mezzanine card to an information handling system motherboard. A mezzanine card bracket couples to a motherboard to hold the mezzanine card in a parallel configuration over the motherboard so that the mezzanine card has a footprint that extends over other components coupled to the motherboard. In order to access the components under the mezzanine card footprint, the mezzanine card bracket includes a rotating portion that rotates from a closed position to an open position. In the closed position, the rotating portion forms part of the support surface that supports the mezzanine card. In the open position, the rotating portion provides space for an end user to access components under the mezzanine card footprint.

More specifically, an information handling system has plural components that cooperate to process information by communicating through a motherboard. For example, a CPU couples to a socket of the motherboard and communicates with DRAM packaged in DIMMs that couple to memory module sockets of the motherboard. One or more mezzanine cards couple to sockets of the motherboard to provide additional functionality with components disposed on the mezzanine cards. One or more mezzanine card brackets couple to the motherboard to provide a support surface on which a mezzanine card rests while disposed in a parallel configuration over the motherboard. The footprint of at least one mezzanine card extends over at least one component coupled to the motherboard, such as a memory module socket. To access the component disposed beneath the mezzanine card, the mezzanine card is removed from the support surface of the bracket and a rotating portion of the bracket is rotated from a closed position over the component to an open position that exposes the component. Once a desired action is performed on the component, such as inserting a DIMM in a memory module socket, the rotating portion is rotated from the open position to the closed position so that a support surface is provided to support the mezzanine card. In one embodiment, a ground path runs through mezzanine card bracket to align with a ground path of the rotating portion so that a ground is available to the mezzanine card through the rotating portion.

The present invention provides a number of important technical advantages. One example of an important technical advantage is that a mezzanine card bracket rotating portion rotates from a closed position to an open position to allow access to components disposed beneath the bracket. The rotating portion moves between the open and closed positions with an ergonomic one-handed operation adaptable to the reduced space available within an information handling system chassis. A ground path runs through the rotating portion to the bracket to engage the rotating portion with a ground of the motherboard when in a closed position. In one embodiment, the open position provides access to DIMM socket latches so that an end user can add, remove and replace a DIMM in a socket without having to remove the mezzanine card bracket from the motherboard. The rotating portion provides a quick, tool-less and intuitive mezzanine card support that operates with the touch of a fingertip to rotate between closed and open positions.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A mezzanine card bracket coupled to an information handling system motherboard rotates between a closed position and an open position to selectively allow access to components of the motherboard disposed within the footprint of the bracket. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
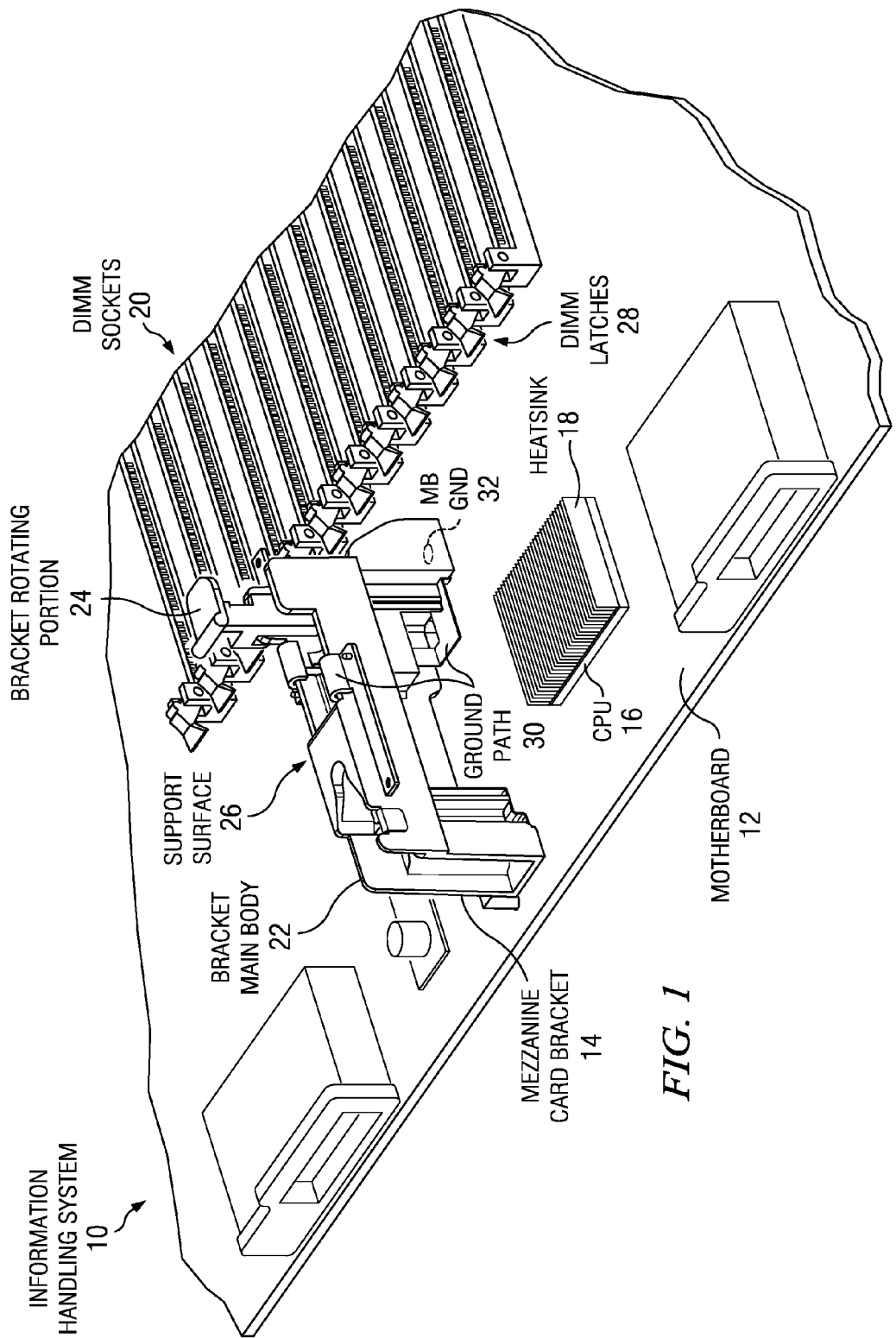
FIG. 1 depicts an upper perspective view of information handling system motherboard with a mezzanine card bracket in an open position.

Referring now to FIG. 1, an upper perspective view depicts an information handling system 10 having a motherboard 12 with a mezzanine card bracket 14 disposed in an open position. Information handling system 10 processes information with a variety of processing components that communicate through wiring integrated in motherboard 12. In the example embodiment depicted by FIG. 1, a pair of central processing units (CPUs) 16 couple to motherboard 12, each CPU 16 having a heat sink 18 to aid with dissipation of excess heat. Each CPU 16 executes instructions, such as for an operating system and applications, by communicating information through mother board 12 with memory coupled to memory module sockets 20. Other processing components aid in processing information by coupling to motherboard 12 to support communication with CPUs 16 and memory couple to memory module sockets 20. For example, in the example embodiment depicted by FIG. 1 various processing functions are supported by mezzanine cards disposed in a parallel configuration relative to motherboard 12. Disposing mezzanine cards in a parallel configuration over motherboard 12 reduces the height of information handling system 10.

In order to support a mezzanine card in a parallel configuration, a mezzanine card bracket 14 couples to motherboard 12, such as with screws, clips or other types of coupling devices. Mezzanine card bracket 14 has a main body 22 that couples to motherboard 12 and a bracket rotating portion 24 that is rotationally coupled to main body 22 to rotate between an open position depicted by FIG. 1 and a closed position depicted by FIG. 2. A support surface 26 extends over motherboard 12 so that a mezzanine card can rest on support surface 26 when installed in information handling system 10. Rotating portion 24 is depicted in an open position rotated upward and away from motherboard 12 to expose memory module sockets 20 coupled to motherboard 12 proximate to bracket 14. In the example embodiment, with rotating portion 24 in the open position, a latch 28 of memory module socket 20 is exposed for manipulation by an end user. An end user who desires to install or remove a memory module in a socket 20 that is covered by bracket 14 when rotating portion 24 is in a closed position can rotate rotating portion 24 to an open position to have access to a latch 28 for coupling and decoupling a memory module in a socket 20.

Mezzanine card bracket 14 includes a ground path 30 that couples with a ground 32 of motherboard 12 so that a mezzanine card disposed on support surface 26 has EMI grounding. Ground path 30 includes a main bracket portion disposed in bracket main body 22 and a rotating ground path portion disposed in rotating portion 24. In the open position, ground path 30 may be allowed to break to allow rotation. In the closed position, the two portions of ground path 30 align and couple to form a conductive path between support surface 26 and motherboard ground 32.

Figure 2:
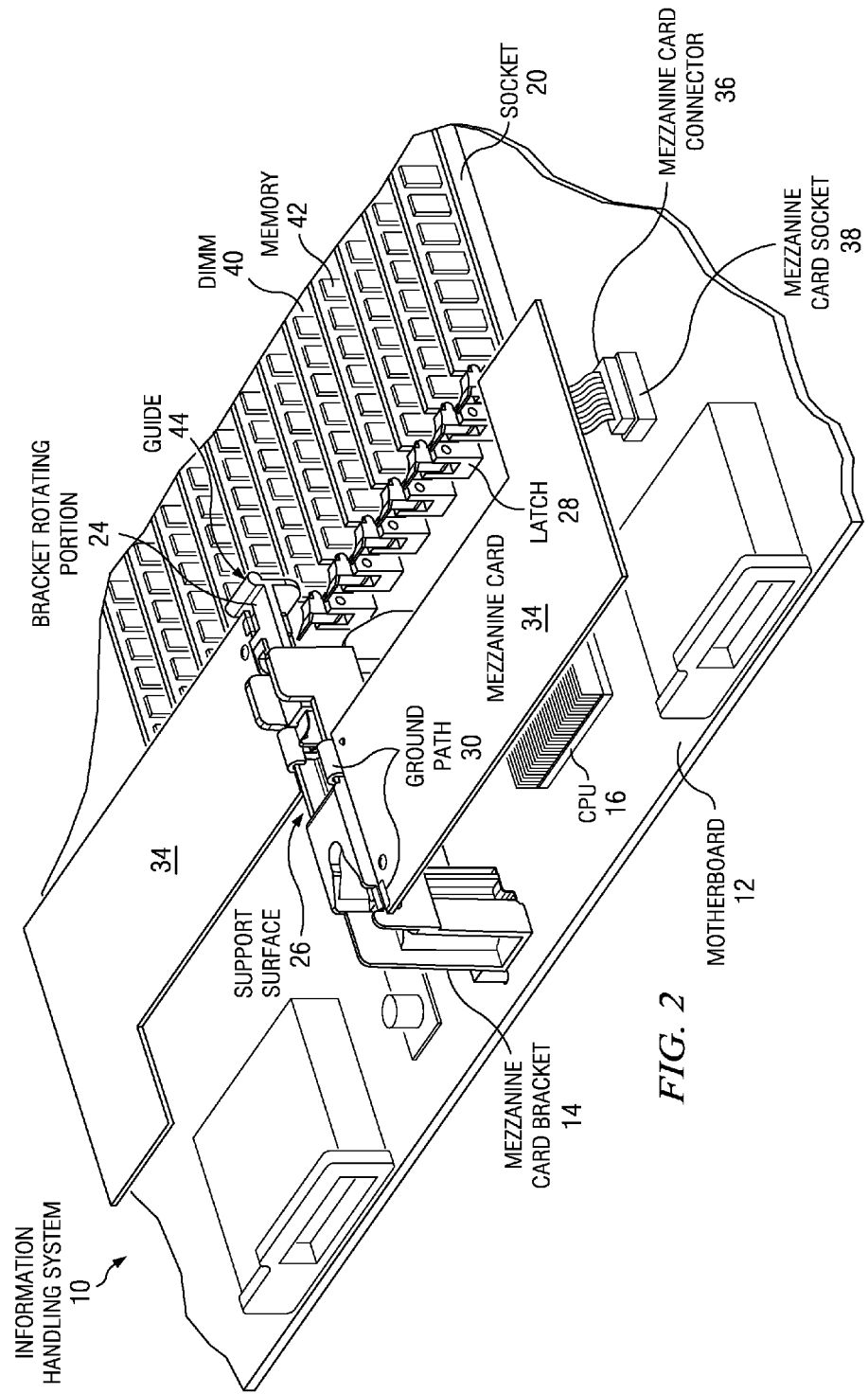
FIG. 2 depicts an upper perspective view of an information handling system motherboard with a mezzanine card bracket in a closed position and supporting a mezzanine card in a parallel configuration.

Referring now to FIG. 2, an upper perspective view depicts an information handling system 10 having a motherboard 12 with a mezzanine card bracket 14 in a closed position and supporting a mezzanine card 34 in a parallel configuration. Mezzanine cards 34 include processing components, such as processors, that perform functions in support of processing by information handling system 10. For example, mezzanine cards 34 communicate with CPUs 16 through a mezzanine card connector 36 coupled to motherboard 12 at a mezzanine card socket 38. Mezzanine cards 34 have a footprint over motherboard 12 that covers a portion of the memory sockets 20 so that some latches 28 are not accessible when a mezzanine card 34 is disposed on support surface 26 to extend over a portion of sockets 20. In the example embodiment depicted by FIG. 2, memory module sockets 20 are populated by memory modules 40 that package memory integrated circuits 42. Latches 28 close to secure memory modules 40 into sockets 20. Bracket rotating portion 24 is rotated to a closed position parallel with support surface 26 so that mezzanine cards 34 rest on support surface 26 in a parallel configuration over motherboard 12.

Extending the footprint of mezzanine cards 34 over other processing components disposed on motherboard 12, such as over sockets 20, allows a more compact information handling system 10, however, components disposed beneath a mezzanine card 34 are not accessible for end user manipulation. In the example embodiment depicted by FIG. 2, mezzanine card 34 extends over a portion of latches 28 and memory modules 40 so that an end has to remove mezzanine card 34 in order to access that portion of latches 28 and memory modules 40. Once mezzanine cards are removed, rotating portion 24 rotated to the closed position as depicted by FIG. 2 will remain in the end user's way if the end user desires to access components under rotation portion 24. To allow complete access to sockets 20, latches 28 and modules 40, the end user pulls up on rotation portion 24 to rotate rotating portion 24 to an open position as depicted by FIG. 1. Once the end user completes maintenance at sockets 20, the end user pushes rotating portion 24 downward to form an extended support surface 26 and re-installs mezzanine cards 34 over the support surface. As depicted by FIG. 2, a guide 44 formed in rotating portion 24 helps to guide mezzanine cards 34 into position and also provides an access point for an end user to pull up on rotating portion 24. Ground path 30 is exposed along support surface 26 to provide EMI protection to installed mezzanine cards 34.

Figure 3:
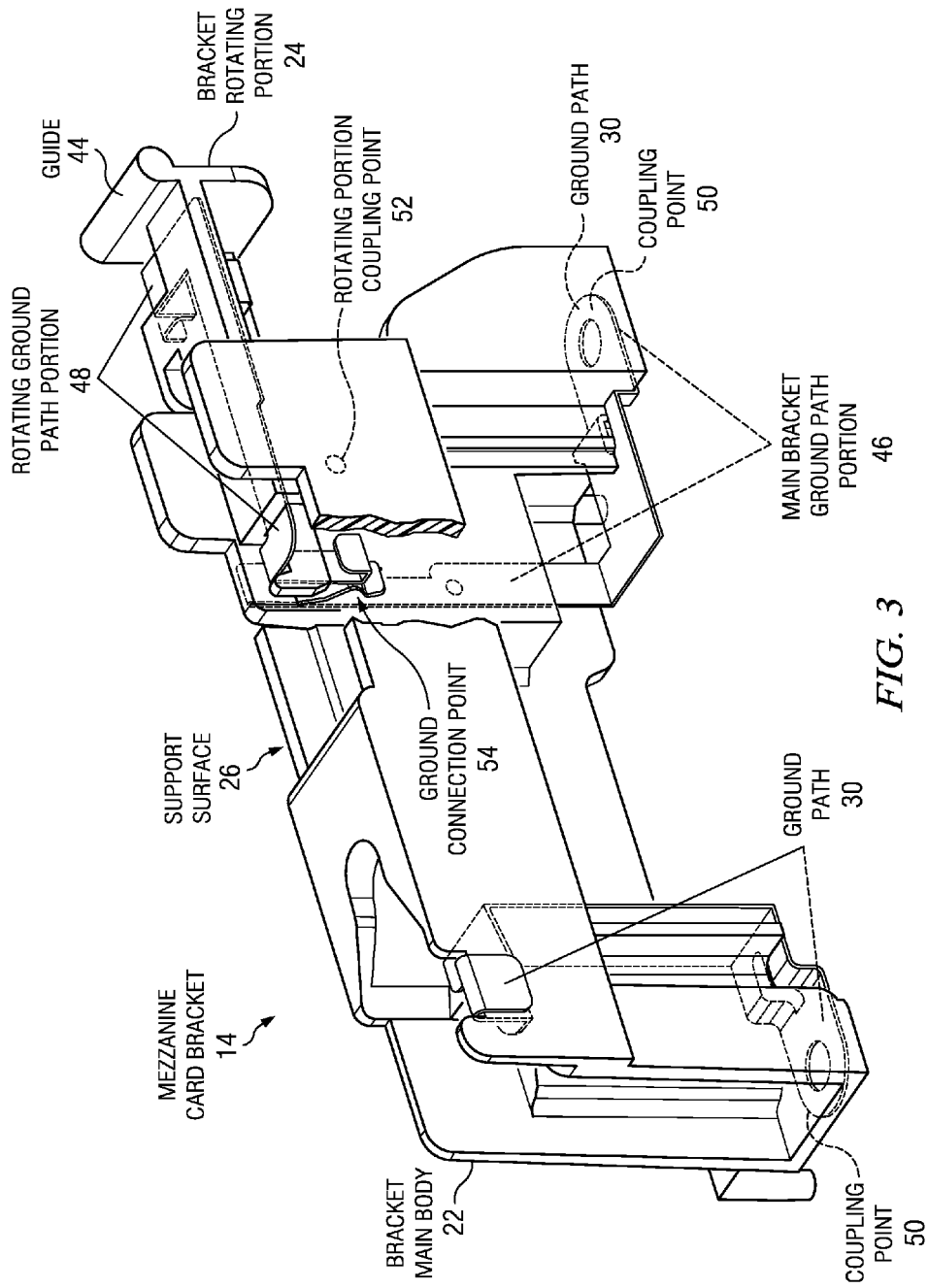
FIG. 3 depicts a breakaway view of a mezzanine card bracket in a closed position having a bracket ground path portion interfaced with a rotating ground path portion.

Referring now to FIG. 3, a breakaway view depicts a mezzanine card bracket 14 with rotating portion 24 in a closed position having a bracket ground path portion 46 interfaced with a rotating ground path portion 48. Bracket main body 22 includes a first ground path 30 that has a single contiguous ground path from a coupling point 50 to support surface 26, and a second ground path 30 formed from separate portions 46 and 48. As rotating portion 24 rotates to the closed position about a rotating portion coupling point 52, main bracket ground path portion 46 and rotating ground path portion 48 come into contact with each other at a ground connection point 54 to form a contiguous ground path 30 from coupling point 50 to support surface 26. Having a ground path 30 on each side of bracket 14 allows a complete EMI shield even where a mezzanine card 34 is only supported by the support surface 26 formed by rotating portion 24.

Figure 4:
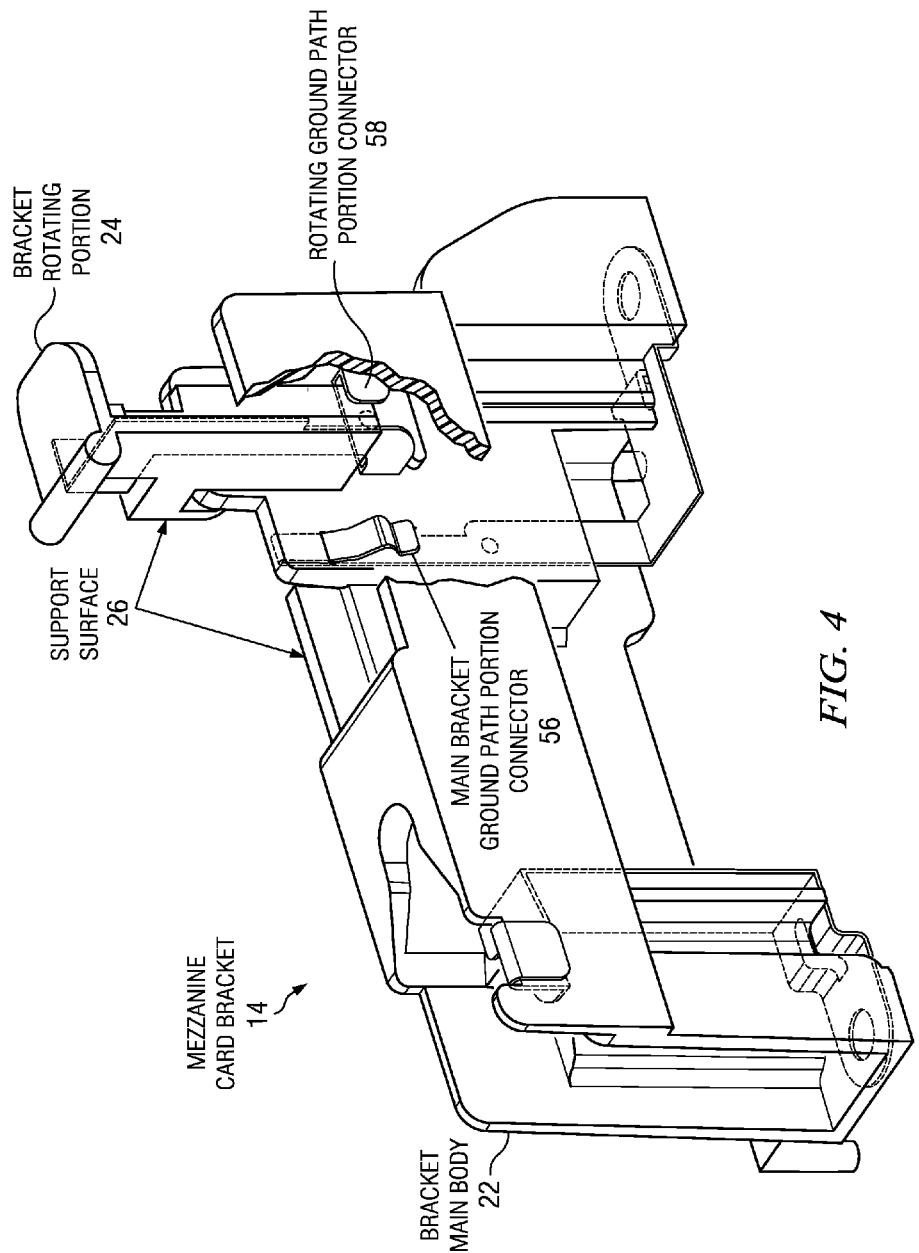
FIG. 4 depicts a breakaway view of a mezzanine card bracket in an open position with a bracket ground path portion connector extending to couple with a rotating ground path portion when a rotating portion moves from the open position to a closed position.

Referring now to FIG. 4, a breakaway view depicts a mezzanine card bracket 14 in an open position with a main bracket ground path portion connector 56 extending to couple with a rotating ground path portion connector 58 when a rotating portion 24 moves from the open position to a closed position. As rotating portion 24 rotates from the open position where it extends upwards perpendicular to motherboard 12 to the closed position having support surface 26 parallel to motherboard 12, main bracket ground path connector 56 engages with rotating ground path portion connector 58 to form a contiguous ground path. Each of connectors 56 and 58 are formed from a conducting metal material, such as stainless steel, so that a biasing force exists upon contact to ensure a good electrical interface. Bracket 14 is formed from a light weight non-conducting material, such as injection molded plastic, that accepts the ground paths 30.

Although the present invention has been described in detail, it should be understood that various changes, substitutions and alterations can be made hereto without departing from the spirit and scope of the invention as defined by the appended claims.

What is claimed is:

1. An information handling system comprising:
    a motherboard;
    a processor coupled to the motherboard, the processor operable to execute instructions that process information;
    plural memory sockets coupled to the motherboard and interfacing through the motherboard with the processor, each memory socket operable to accept a memory module having memory, the memory operable to store information accessible by the processor;
    a mezzanine card socket disposed in the motherboard and operable to couple to a mezzanine card connector of a mezzanine card, the mezzanine card disposed in a parallel configuration over the motherboard; and
    a mezzanine card bracket coupled to the motherboard proximate the mezzanine card connector, the mezzanine card bracket having a support surface to support the mezzanine card in the parallel configuration, the support surface including a rotating portion operable to rotate between a closed position and an open position, the closed position overlapping at least a portion of at least one memory socket, the open position exposing the at least a portion of at least one memory socket.

2. The information handling system of claim 1 further comprising:
    a memory module disposed in the at least one memory socket, at least a portion of the memory module disposed beneath the mezzanine card bracket in the closed position; and
    a mezzanine card resting on the mezzanine card bracket support surface, at least a portion of the mezzanine card disposed over the memory module.

3. The information handling system of claim 1 further comprising:
    a ground exposed at the motherboard proximate the mezzanine card connector; and
    a ground path disposed in the mezzanine card bracket, the ground path aligned with the ground exposed at the motherboard and extending to the support surface to align with a ground of the mezzanine card.

4. The information handling system of claim 3 wherein the ground path further comprises:
    a first ground path portion extending from the motherboard ground through the mezzanine card bracket to the rotating portion; and
    a second ground path portion extending through the mezzanine card bracket rotating portion to the mezzanine card ground, the second ground path portion connecting to the first ground path portion when the rotation portion is in the closed position.

5. The information handling system of claim 4 further comprising a mezzanine card resting on the support surface and having a ground aligned to couple with the second ground path.

6. The information handling system of claim 5 wherein the rotating portion includes a guide extending upward and positioned to interact with the mezzanine card so that the second ground path connects with mezzanine card ground.

7. The information handling system of claim 1 wherein the rotating portion and mezzanine card bracket couple to each other with opposing protrusions and openings.

8. The information handling system of claim 7 wherein the rotating portion and mezzanine card bracket comprise injection molded plastic pieces.

9. A method for assembly of an information handling system, the method comprising:
moving a portion of a mezzanine card bracket from a closed position to an open position;
interacting with a component of the information handling system proximate the mezzanine card bracket, the component exposed by the open position; and
moving the portion of the mezzanine card bracket from the open position to the closed position, the component at least partially covered by the closed position.

10. The method of claim 9 wherein moving a portion of a mezzanine card bracket further comprises rotating a rotating portion of the mezzanine card bracket from the closed position to the open position about a pivot point that couples the rotating portion to a main portion of the mezzanine card bracket.

11. The method of claim 9 wherein interacting with a component of the information handling system further comprises extracting a memory module from a memory module socket.

12. The method of claim 9 wherein interacting with a component of the information handling system further comprises inserting a memory module into a memory module socket.

13. The method of claim 9 further comprising resting a mezzanine card on a support surface that includes the mezzanine card bracket and the portion that moves, the support surface holding the mezzanine card in a parallel configuration relative to a motherboard of the information handling system.

14. The method of claim 13 further comprising interfacing a ground between the motherboard and the mezzanine card with a ground path that extends through the portion that moves.

15. The method of claim 13 wherein the mezzanine card extends over at least a portion of the component to make the component inaccessible.

16. The method of claim 15 wherein the component comprises a latch operable to lock and release a memory module in a memory module socket.

17. A mezzanine card bracket comprising:
a main body having coupling points operable to couple with a motherboard, the main body having an upper surface operable to support a mezzanine card in a parallel configuration relative to the motherboard; and
a rotating portion rotationally coupled to the main body, the rotating portion operable to rotate relative to the main body between a closed position and an open position, the closed position aligning an upper surface of the rotating portion with the upper surface of the main body to provide a support surface to support the mezzanine card, the open position providing access to a component couple to the motherboard beneath the rotation portion when the rotating portion is the closed position.

18. The mezzanine card bracket of claim 17 further comprising a ground path operable to couple a motherboard ground and a mezzanine card ground, the ground path passing through the main body and the rotating portion to the support surface.

19. The mezzanine card bracket of claim 17 wherein the rotating portion defines a component space over the motherboard when the rotating portion is in the closed position, the component space providing room beneath the rotating portion for a component to reside at the motherboard.

20. The mezzanine card bracket of claim 17 further comprising opposing detents disposed on the main body and opposing openings on the rotating portion, the opposing openings fitting over the opposing detents at a pivot point of the rotating portion.

* * * * *